United States Patent [19]

Iizuka et al.

[11] Patent Number: 5,089,538
[45] Date of Patent: Feb. 18, 1992

[54] COMPOSITION SUITED FOR ADDITION TO GROUND EXCAVATION STABILIZING LIQUID, STABILIZING LIQUID COMPOSITION, AND GROUND EXCAVATION METHOD

[75] Inventors: Yoshio Iizuka; Yoshiyuki Oothuka, both of Tokyo; Satoshi Tanaka; Manabu Yamamoto, both of Kyoto, all of Japan

[73] Assignees: Shimizu Construction Co., Ltd., Tokyo; Sanyo Chemical Industries, Ltd., Kyoto, both of Japan

[21] Appl. No.: 381,399

[22] PCT Filed: Nov. 16, 1987

[86] PCT No.: PCT/JP87/00887

§ 371 Date: Jul. 14, 1989

§ 102(e) Date: Jul. 14, 1989

[51] Int. Cl.$^5$ .............................. C09K 17/00
[52] U.S. Cl. .................... 523/132; 524/432; 524/433
[58] Field of Search ............... 523/132; 524/432, 433

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

A composition suited for addition to ground excavation stabilizing liquid which are able to prevent effectively the deterioration of the stabilizing liquid due to seawater or cement mixing in or to prevent the putrefaction of the liquid by bacteria, an excavation stabilizing liquid composition, and a ground excavation method using these compositions are disclosed.

The composition suited for addition to excavation stabilizing liquid comprises a mono-valency salt (a) of unsaturated carboxylic acid (co)polymer of polymerization degree 5,000 or less and a compound (b) selected from a group composed of ① mono-valency aluminate, ② the group II or III metal oxide, and ③ salt of a higher order compound. The excavation stabilizing liquid compositions comprises said composition suited for addition to excavation stabilizing liquid, inorganic clay (c), and as necessary, a compound (d) selected from a group composed of water soluble cellulose derivatives, water soluble starch derivatives, polysaccharides and their derivatives. The ground excavation method is a method for excavating the ground by excavator with staying or circulating the excavation stabilizing liquid composition in the excavated area.

14 Claims, No Drawings

COMPOSITION SUITED FOR ADDITION TO GROUND EXCAVATION STABILIZING LIQUID, STABILIZING LIQUID COMPOSITION, AND GROUND EXCAVATION METHOD

TECHNICAL FIELD

This invention relates to a composition which is able to prevent effectively the deterioration of ground excavation stabilizing liquid by sea water or cement mixing in and to prevent the putrefaction of the liquid by bacteria, to a composition for excavation stabilizing liquid, and to a method for the ground excavation using these composition.

BACKGROUND ART

In usual ground excavation methods, excavation stabilizing liquid is used, which comprises main components such as inorganic clay and, in some cases, water soluble high polymer, a dispersant such as sodium polyacrylate or sodium hexametaphosphate, and additives such as various types of antiseptics.

In the usual technique, however, the prevention of the deterioration of excavation stabilizing liquid by seawater or cement mixing in or of the putrefaction of the stabilizing liquid composition has been insufficient, leading to the large labor and cost for the ground excavation.

The object of the invention is, in the ground excavation, to provide a composition suited for addition to excavation stabilizing liquid which is able to prevent effectively the deterioration of stabilizing liquid by seawater or cement mixing in and to prevent the putrefaction of the liquid by bacteria, to provide an excavation stabilizing liquid composition, and to provide a method for excavation using these compositions.

DISCLOSURE OF INVENTION

The invention is directed to a composition, which comprises a mono-valent salt (a) of an unsaturated carboxylic acid (co)polymer of a polymerization degree 5,000 or less and a compound (b) selected from a group consisting of ① a mono-valent aluminate, ② a Group II or III metal oxide, and ③ a salt of a higher order compound, which is suitable for inclusion in an excavation stabilizing liquid composition. The entire excavation stabilizing liquid composition is comprised of components (a) and (b), inorganic clay (c), and, as necessary, a compound (d) selected from the group consisting of water soluble cellulose derivatives, water soluble starch derivatives, polysaccharides and their derivatives. The invention is also directed to a ground excavation method using said excavation stabilizing liquid composition. The unsaturated carboxylic acid (co)polymer refers to a single polymer and/or copolymer of an unsaturated carboxylic acid monomer.

Examples of unsaturated carboxylic acid (co)polymers of polymerization degree 5,000 or less, include (co)polymers of unsaturated carboxylic acids (unsaturated monocarboxylic acids such as acrylic, methacrylic, or crotonic acids; unsaturated dicarboxylic acid such as fumaric, maleic, or itaconic acid) and of the anhydride (maleic anhydride). Particularly, preferred copolymers are acrylic and methacrylic acid (co)polymer. Suitable mono-valent cations of the polymeric salts include the alkali metals (sodium and potassium), ammonium ion, or amine ions [monoethanol, diethanol, triethanol, or alkyl ($C_1 \sim C_4$) amine ions], preferably sodium and potassium ions. The neutralization of the polymer degree is usually $50 \sim 100\%$, preferably $80 \sim 100\%$.

The unsaturated carboxylic acid (co)polymer may be copolymerized with another monomer as necessary, including a hydrophilic monomer such as sulfonic acidic group containing monomer [vinyl-, allyl-, vinyltoluene-, or styrene-sulfonic acid and their mono-valent salt], a hydroxyl group containing monomer [allyl alcohol, hydroxyethyl(meth)acrylate], and amide group containing monomer [(meth)acrylamide, N-methyl(meth)acrylamide, N-hydroxyethyl(meth)acrylamide, N-vinylpyrrolidone], an amino group containing monomer [dimethylaminoethl(meth)acrylate, morpholinoethyl(meth)acrylate, dimethylaminoethylfumarate, 2-vinylpyridine, 4-vinylpyridine, N-vinylpyridine, N-vinylimidazoline], a quaternary ammonium salt containing monomer [N,N,N-trimethyl-N-acryloyloxyethylammonium chloride], a weak hydrophilic monomer such as nitrile group containing monomer [(meth)acrylonitrile], and an ester group containing monomer [vinylacetate]. In the mentioned above, for example, (meth) acrylonitrile refers to methacrylonitrile usable also, likewise in the other cases.

The quantity of the hydrophilic monomer is usually 30% or less based on the quantity of total monomer, preferably 10% or less. The quantity of the weak hydrophilic monomer is usually 15% or less based on the quantity of total monomer, preferably 5% or less.

The mono-valent salt of unsaturated carboxylic acid (co)polymer may be prepared after polymerization, or may be prepared by polymerizing a mono-valent salt of a monomer.

The polymerization degree of the unsaturated carboxylic acid (co)polymer is usually 5,000 or less, preferably $50 \sim 2,500$. If the polymerization degree exceeds 5,000, soil and cement are liable to aggregate because of the stronger aggregation activity, and when heavy metal ion mixing in, insoluble matters are liable to be produced, which promote the gelation of the excavation stabilizing liquid, and deterioration of the property of the stabilizing liquid.

Examples of compound (b) include the following ①~③. Mono-valent aluminates (1) include hydrated metaaluminic acid alkalimetal salts [$M^1AlO_2.mH_2O$ ($M^1$:alkalimetal), for example, $NaAlO_2.5/4H_2O$, $NaAlO_2.3H_2O$, and $KAlO_2.3/2H_2O$], and anhydrous aluminic acid alkalimetal salts [$M^1AlO_2$, for example, $NaAlO_2$ and $KAlO_2$; and sodium orthoaluminate, for example, $Na_3AlO_3$]. In the aluminic acid alkalimetal salt, the molar ratio(x) of $M^1_2O$ to $Al_2O_3$ is usually $1.0 \sim 2.5$, preferably $1.0 \sim 2.0$. Of these alkalimetal salts, sodium salt is preferred.

Sodium aluminate is generally prepared by mixing, heating, stirring, and reacting hydrated aluminum oxide and caustic soda. For example, it is obtained by crystallization after reacting aluminum oxide trihydrate and caustic soda at $100° \sim 150°$ C. There is no special limitation concerning the manufacturing method.

The group II or III metal oxide, includes magnesium oxide, aluminum oxide, and calcium oxide, preferably magnesium oxide.

Salt (3) of the higher order compound, includes double salts and complex salts. Double salts include sodium alum, potassium alum, and ammonium alum. Complex salts include mono-valent complex anion containing salts [ethylenediamine-tetraacetatocobalt acid (III) alkali metal salt], di-valent complex anion containing salts

[ethylenediamine-tetraacetato-nickel acid (III) alkali metal salt], and tri or more valent complex anion containing salts [trioxalato-aluminic acid (III) alkali metal salts, di-µ-hydroxobis [dioxalato-cobalt acid (III)] alkali metal salts, hexanitrocobalt acid (III) alkali metal salts]. Alkali metal salts include sodium salts and potassium salts.

Together with compound (b), an as necessary, alkali metal carbonate may be used in combination. As the alkali metal carbonate, potassium and sodium carbonate are preferred.

The net quantity of (a) in the composition suited for addition to excavation stabilizing liquid is usually 15~85% of the total net quantity of (a) and (b), preferably 30~70%. An amount less than 15% causes gelation when cement is mixed in and an amount more than 85% causes gelation when sea water is mixed in, sea water both of which, result in deterioration of the property of stabilizing liquid.

The weight ratio of compound(b) and alkali metal carbonate used in combination, as necessary is usually 1:0~100 to (b), though without special limitation.

The added quantity(net) of the composition suited for addition to excavation stabilizing liquid is usually 0.01~5% to the total net weight of the stabilizing liquid composition, preferably 0.05~3%. Less than 0.01% can not be expected to prevent the deterioration of stabilizing liquid by sea water, cement, or another electrolyte, and more than 5% will not result in additional advantages and is, in fact, economically, disadvantageous.

The composition suited for addition of the invention comprises (a) and (b), and in addition a dissolution promoter (for example, ethylene glycol, diethylene glycol, polyethylene glycol), and dispersion peptizer (for example, sodium nitrohumate, tannins, lignin sulfonate, condensed phosphate) which may also be used in proper combination.

The excavation stabilizing liquid composition of the invention comprises a mono-valent salt (a) of an unsaturated carboxylic acid (co)polymer of polymerization degree 5,000 or less, a compound (b) selected from group composed of ① mono-valent aluminate, ② the group II or III metal oxide, and ③ a salt of higher order compound, inorganic clay (c), and as necessary water soluble cellulose derivatives, water soluble starch derivative, polysaccharide and its derivative(d).

Inorganic clay(c) includes bentonite, atapalgite, sepiolite, sericite, ilite, and chlolite, particularly preferably bentonite.

The net quantity of (c) to the excavation stabilizing liquid is usually 0.1~25%, preferably 2~10%. That less than 0.1% does not result in the stabilizing liquid having sufficient viscosity, filtration, wall building characteristics, and excavation waste suspension maintainability, and that more than 25% lowers the fluidity of stabilizing liquid, hindering ground excavation.

The compounds (d) used as necessary include the following substances. The water soluble cellulose derivatives include sodium carboxymethylcellulose, hydroxyethylcellulose, and methylcellulose. The water soluble starch derivatives include gelatinated cornstarch. The polysaccharide and its derivatives include xanthan gum. Among them, water soluble cellulose derivatives are preferable, particularly preferred sodium carboxymethylcellulose.

The net quantity of the compound(d) to the excavation stabilizing liquid is usually 0~3%, preferably 0~0.5%. More than 3% lowers the fluidity of stabilizing liquid, hindering ground excavation.

The excavation stabilizing liquid composition of the invention comprises (a), (b), (c), and as necessary (d), besides weighter (for example, balite), dispersion peptizer (for example, sodium nitrohumate, tannins, lignin sulfonate, and condensed phosphate), mud-loss preventer (for example, walnut shell, mica piece, pulverized vermiculite, cut film, processed pulp, asbestos fiber, cottonseed press waste, diatomaceous earth, hay, planing waste, fibrous substance, and super absorbent polymer), and surface active agents for stabilizing liquid (for example, polyoxyethylene glycol, petroleum sulfonate, fatty acid potassium soap, polyalkyleneglycol derivatives, sorbitan oleate, polyoxypropylenemethylether, and sulfonated asphalt derivatives) may be used in combination properly.

As the manufacturing method of the stabilizing liquid composition of the invention, there are following methods.

(1) A method wherein inorganic clay, water soluble high molecule, and the excavation stabilizing liquid of the invention are charged into kneading water at the same time.

(2) A method wherein inorganic clay and water soluble high molecule are charged into kneading water in advance, and after their swelling the additions of the invention are added with stirring. Of these methods, method (2) is preferred.

The stabilizing liquid composition for ground excavation thus obtained has usually specific gravity of 1.01~1.35, funnel viscosity of 21~45 sec, 10 min gel-strength of 5 lb/100 ft$^2$ or less, and the filtrate of 30 ml or less.

As the ground excavation methods, there are methods which are described at 177~232 pages of "GROUTS AND DRILLING MUDS IN ENGINEERING PRACTICE" BUTTERWORTH & CO., LTD. (PUBLISHERS) LONDON (1963). The state of execution is generally as follows.

The ground is excavated by excavator with staying or circulating the excavation stabilizing liquid composition of the invention in the excavated area. In this case, the stabilizing liquid composition always fills the inner part of the excavated area to operate absorption of friction heat, radiation of heat, and lubrication, and excavated earth and sand are carried out to the ground surface to advance excavation, and at the time the built mud-wall without water permeability prevents the breaking of the excavated hole wall. After the fixed excavation finishing, in certain cases, reinforcement framework is put and concrete is charged from the bottom, and with recovering the stabilizing liquid from the excavated groove, concrete is filled in the excavated area to construct piles and walls. The stabilizing liquid replaced by concrete is returned into the tank to reuse.

The invention has the following marked effects.

(1) The composition using the addition (the composition suited for addition to excavation stabilizing liquid) of the invention does not largely change the stabilizing liquid properties (dispersion stability, the filtration and wall building characteristics) even if sea water flows in during ground excavating.

(2) The composition using the addition of the invention scarcely changes the stabilizing liquid properties (dispersion stability, the filtration and wall building characteristics). Accordingly, the reuse is possible.

(3) The composition using the addition of the invention is difficult to putrefy.

(4) The composition using the addition of the invention is excellent in the dispersion stability of inorganic clay such as bentonite.

(5) The composition using the addition of the invention has small filtrate, being excellent in the filtration and wall building characteristics, that is the excavated hole breaking preventing property.

(6) In the ground excavating method using the excavation stabilizing liquid composition of the invention, the excavation stabilizing liquid is difficult to deteriorate. Accordingly, wastes are decreased, leading to the cost advantage.

BEST MODE FOR CARRYING OUT THE INVENTION

The following examples are illustrative of the present invention. The present invention is not limited to the examples. The term "part" in examples and comparative examples represents the weight. The temperature of excavation stabilizing liquid is 20°±3° C. The test procedure in examples and comparative examples is as follows.

(1) Funnel viscosity (FV)

Measurement was made by Funnel viscosity meter (500 ml).

Unit: sec (2) 10 Min gel strength (10 Gel)

Measurement was made by Fann VG meter.

Unit: lb/100 ft$^2$ (3) The static filtration test

By the filter press of API standard, the filtrate was measured after 30 min under 3 kgf/cm$^2$ pressure.

Unit: ml (4) Stability against cement mixing in

To the excavation stabilizing liquid 100 parts Portland cement 1 and 3 parts are added, sufficiently mixed, and after lapse of one day the properties of the excavation stabilizing liquid were measured as to the above mentioned (1)~(3).

(5) Stability against sea water mixing in

To the excavation stabilizing liquid 100 parts "Aquamarin S" (artificial seawater made in Yashima Chemicals, Inc.) 0.4 and 1.2 parts are added, sufficiently mixed, and after lapse of one day the properties of the excavation stabilizing liquid were measured as to the above mentioned (1)~(3).

Polymers 1~7 in examples and comparative examples and compounds 1~6 are presented in the following.

Polymer 1: sodium polymethacrylate

Polymer 2: methacrylic acid(60)-acrylic acid(40) copolymer sodium salt

Polymer 3: sodium polyacrylate

Polymer 4: acrylic acid(50)-crotonic acid(50) copolymer sodium salt

Polymer 5: acrylic acid(50)-itaconic acid(50) copolymer sodium salt

Polymer 6: methacrylic acid(50)-itaconic acid(50) copolymer sodium salt

Polymer 7: acrylic acid(50)-fumaric acid(50) copolymer sodium salt

Figures within ( ) shows % based on the total weight of acrylic acid and methacrylic acid.

Compound 1: magnesium oxide

Compound 2: potassium aluminate

Compound 3: potassium trioxalatoaluminate(III)

Compound 4: sodium aluminate

Compound 5: CMC (carboxymethylcellulose, etherification degree 1.10, polymerization degree 750)

Compound 6: sodium hexametaphosphate

EXAMPLES 1~9 AND COMPARATIVE EXAMPLES 1~12

Compositions of additions of the invention (examples 1~9) and comparative additions (comparative examples 1~12) are showed in Table-1.

TABLE 1

| Composition of stabilizing liquid (part) | Examples | | | | | | | | |
|---|---|---|---|---|---|---|---|---|---|
| | 1 | 2 | 3 | 4 | 5 | 6 | 7 | 8 | 9 |
| Polymer 1 (Polymerization degree 500) | 0.2 | | | | | | | | |
| Polymer 2 (Polymerization degree 100) | | 0.2 | | | | | | | |
| Polymer 2 (Polymerization degree 500) | | | 0.2 | | | | | | |
| Polymer 2 (Polymerization degree 1,000) | | | | 0.2 | | | | | |
| Polymer 3 (Polymerization degree 500) | | | | | 0.2 | | | | |
| Polymer 4 (Polymerization degree 1,000) | | | | | | 0.2 | | | |
| Polymer 5 (Polymerization degree 500) | | | | | | | 0.2 | | |
| Polymer 6 (Polymerization degree 100) | | | | | | | | 0.2 | |
| Polymer 7 (Polymerization degree 500) | | | | | | | | | 0.2 |
| Compound 1 | 0.2 | | | 0.2 | | | 0.2 | | |
| Compound 2 | | 0.2 | | | 0.2 | | | 0.2 | |
| Compound 3 | | | 0.2 | | | | | | 0.2 |
| Compound 4 | | | | | | 0.2 | | | |

| Composition of stabilizing liquid (part) | Comparative examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polymer 2 (Polymerization degree 500) | 0.2 | 0.2 | | | | | | | | | | |
| Polymer 2 (Polymerization degree 10,000) | | | 0.2 | 0.2 | 0.2 | | | | | | | |
| Polymer 3 (Polymerization degree 500) | | | | | | 0.2 | 0.2 | | | | | |
| Polymer 3 (Polymerization degree 10,000) | | | | | | | | | 0.2 | 0.2 | 0.2 | 0.2 |
| Compound 1 | | | | 0.2 | | | | | 0.2 | | | |
| Compound 2 | | | | | 0.2 | | | | | 0.2 | | |
| Compound 3 | | | | | | 0.2 | | | | | 0.2 | |
| Compound 4 | | | | | | | | | | | | 0.2 |
| Compound 5 | | | 0.1 | | | | 0.1 | | | | | |

Pure water 100 parts and bentonite (Kunigel V1 made in Kunimine Industries, Co., Ltd.) 6 parts were charged into a juicer-mixer and stirred for 2 min. After standing for one day, the addition for the excavation stabilizing liquid of the invention and comparative substances showed in Table-1 were charged and again stirred for 2 min to obtain the stabilizing liquid composition. Results of the measurement of the properties of thus obtained composition are showed in Table-2.

To pure water 100 parts in a mixer, bentonite (Kunigel V1 made in Kunimine Industries Co., Ltd.) 2~6 parts and CMC (Compound 5) 0.1~0.3 part were charged, and after swelling the additions of the invention and comparative substances showed in Table-3 were charged and sufficiently stirred to obtain the excavation stabilizing liquid. Results of the measurement of the properties of thus obtained stabilization liquid are showed in Table-4.

TABLE 2

|  |  | Examples |  |  |  |  |  |  |  |  |
|---|---|---|---|---|---|---|---|---|---|---|
|  |  | 1 | 2 | 3 | 4 | 5 | 6 | 7 | 8 | 9 |
| Properties of new stabilizing liquid (after a day) | FV | 24.3 | 24.5 | 25.0 | 25.3 | 24.5 | 25.5 | 26.0 | 25.4 | 24.7 |
|  | 10 Gel | 1.0 | 1.0 | 1.0 | 1.0 | 1.0 | 1.0 | 1.0 | 1.0 | 1.0 |
|  | The filtrate | 22.5 | 21.5 | 23.0 | 20.0 | 22.0 | 18.0 | 21.0 | 20.5 | 21.5 |
| Cement: 1 part mixing in | FV | 23.7 | 24.3 | 24.5 | 24.6 | 23.8 | 24.7 | 25.2 | 25.0 | 24.3 |
|  | 10 Gel | 1.0 | 1.0 | 1.0 | 1.0 | 1.0 | 1.0 | 1.0 | 1.0 | 1.0 |
| Cement: 3 parts mixing in | FV | 23.0 | 23.8 | 24.0 | 24.2 | 23.5 | 24.5 | 25.0 | 24.8 | 24.0 |
|  | 10 Gel | 1.0 | 1.0 | 1.0 | 1.0 | 1.0 | 1.0 | 1.0 | 1.0 | 1.0 |
|  | The filtrate | 23.0 | 22.5 | 22.5 | 21.0 | 23.0 | 20.0 | 23.0 | 22.5 | 24.0 |
| Aquamarin S: 0.4 part mixing in | FV | 24.5 | 24.6 | 25.1 | 25.2 | 24.3 | 25.0 | 25.8 | 25.3 | 24.7 |
|  | 10 Gel | 1.0 | 1.0 | 1.0 | 1.0 | 1.0 | 1.0 | 1.0 | 1.0 | 1.0 |
| Aquamarin S: 1.2 parts mixing in | FV | 25.0 | 25.7 | 26.1 | 26.7 | 26.0 | 26.5 | 26.8 | 26.5 | 25.3 |
|  | 10 Gel | 2.0 | 2.0 | 2.0 | 2.0 | 2.0 | 2.0 | 2.0 | 2.0 | 2.0 |
|  | The filtrate | 22.0 | 23.0 | 23.5 | 22.3 | 23.5 | 21.0 | 23.0 | 22.5 | 23.5 |
|  |  | Comparative examples |  |  |  |  |  |  |  |  |  |  |
|  |  | 1 | 2 | 3 | 4 | 5 | 6 | 7 | 8 | 9 | 10 | 11 | 12 |
| Properties of new stabilizing liquid (after a day) | FV | 24.2 | 23.0 | 25.2 | 25.8 | 26.2 | 26.0 | 25.3 | 27.2 | 26.3 | 27.2 | 26.7 | 26.6 |
|  | 10 Gel | 1.0 | 1.0 | 1.0 | 1.0 | 1.0 | 1.0 | 1.0 | 1.0 | 1.0 | 1.0 | 1.0 | 1.0 |
|  | The filtrate | 13.5 | 12.0 | 10.5 | 24.0 | 23.0 | 25.0 | 18.0 | 20.0 | 21.5 | 23.0 | 25.0 | 19.0 |
| Cement: 1 part mixing in | FV | * | 22.5 | 22.0 | 25.6 | 27.3 | 26.8 | 25.3 | 28.5 | 27.2 | 28.3 | 28.1 | 27.9 |
|  | 10 Gel | * | 1.0 | 14.0 | 7.0 | 9.0 | 12.0 | 1.0 | 4.0 | 9.0 | 5.0 | 7.0 | 9.0 |
| Cement: 3 parts mixing in | FV | * | 22.8 | 28.0 | 27.3 | 28.0 | 29.3 | 25.1 | 30.0 | 29.3 | 30.5 | 32.3 | 31.6 |
|  | 10 Gel | * | 1.0 | 30.0 | 15.0 | 19.0 | 21.0 | 1.0 | 8.0 | 15.0 | 23.0 | 16.0 | 12.0 |
|  | The filtrate | * | 14.0 | 18.0 | 35.0 | 32.0 | 34.0 | 23.0 | 29.5 | 27.0 | 30.0 | 26.0 | 25.5 |
| Aquamarin S: 0.4 part mixing in | FV | 32.0 | 24.5 | 27.0 | 28.2 | 27.3 | 27.6 | 26.0 | 29.2 | 27.2 | 28.6 | 26.9 | 27.3 |
|  | 10 Gel | 30.0 | 10.0 | 10.0 | 12.0 | 12.0 | 14.0 | 7.0 | 5.0 | 5.0 | 8.0 | 7.0 | 11.0 |
| Aquamarin S: 1.2 parts mixing in | FV | 35.0 | 32.0 | 32.0 | 30.3 | 30.0 | 31.5 | 29.5 | 30.5 | 29.8 | 29.3 | 28.2 | 29.2 |
|  | 10 Gel | 55.0 | 25.0 | 15.0 | 23.0 | 18.0 | 20.0 | 18.0 | 10.0 | 13.0 | 19.0 | 15.0 | 16.0 |
|  | The filtrate | 39.5 | 21.0 | 20.0 | 34.0 | 31.5 | 30.5 | 28.0 | 33.0 | 31.5 | 30.0 | 29.0 | 27.0 |

*: Measurement impossible because of gelation

The properties of stabilizing liquid added addition of the invention were good. After standing for a week, it was confirmed that the stabilizing liquid of comparative example 3 and 8 generated putrid smells, and their viscosity were lowered remarkably.

EXAMPLES 10~14 AND COMPARATIVE EXAMPLES 13~15

The compositions of the excavation stabilizing liquid composition (examples 10~14) of the invention and comparative examples 13~15 are showed in Table-3.

The excavation of the ground containing about 10% seawater component (ca 2000 ppm converted to $Cl^-$ ion) and improved by cement was made by drilling method with circulating excavation stabilizing liquid for 2 days for 8 hrs per day at 25°~30° C. of atmospheric temperature. After that, the properties of stabilizing liquid taken from the upper part of the stabilizing liquid circulating tank were measured. The results were as follows.

The excavation stabilizing liquid of comparative examples 13 and 14 increased in funnel viscosity, 10 min

TABLE 3

| Composition of stabilizing liquid (part) | Examples |  |  |  |  | Comparative examples |  |  |
|---|---|---|---|---|---|---|---|---|
|  | 10 | 11 | 12 | 13 | 14 | 13 | 14 | 15 |
| Pure water | 100 | 100 | 100 | 100 | 100 | 100 | 100 | 100 |
| Bentonite | 6 | 6 | 2 | 5 | 5 | 6 | 6 | 2 |
| Compound 5 | 0.1 | 0.1 | 0.3 |  |  | 0.1 | 0.1 | 0.3 |
| Addition: |  |  |  |  |  |  |  |  |
| Polymer 1 (Polymerization degree 1,000) | 0.3 |  |  |  |  |  |  |  |
| Polymer 2 (Polymerization degree 500) |  | 0.3 |  |  |  |  |  |  |
| Polymer 3 (Polymerization degree 100) |  |  | 0.3 |  |  | 0.6 |  |  |
| Polymer 4 (Polymerization degree 500) |  |  |  | 0.2 |  |  |  |  |
| Polymer 6 (Polymerization degree 500) |  |  |  |  | 0.2 |  |  |  |
| Compound 1 | 0.3 |  |  |  |  |  |  |  |
| Compound 2 |  |  |  |  | 0.2 |  |  |  |
| Compound 3 |  |  |  | 0.2 |  |  |  |  |
| Compound 4 |  | 0.3 | 0.3 |  |  |  |  |  |
| Compound 6 |  |  |  |  |  |  | 0.6 |  |
| Total quantity of combined additions | 0.6 | 0.6 | 0.6 | 0.4 | 0.4 | 0.6 | 0.6 |  | gel strength (10 Gel), and the filtrate. The stabilizing liquid of comparative example 15 decreased remarkably in funnel viscosity and also generated a putrid smell. On the other hand, all of the stabilizing liquid of examples were good.

TABLE 4

|  |  | Examples |  |  |  |  | Comparative Examples |  |  |
|---|---|---|---|---|---|---|---|---|---|
|  |  | 10 | 11 | 12 | 13 | 14 | 13 | 14 | 15 |
| Properties of new | FV | 26.3 | 25.8 | 30.0 | 26.2 | 26.3 | 25.8 | 27.1 | 31.0 |
| stabilizing liquid | 10 Gel | 1.0 | 1.0 | 1.0 | 1.0 | 1.0 | 1.0 | 1.0 | 3.0 |
| (after a day) | The filtrate | 8.0 | 8.0 | 10.0 | 20.0 | 20.0 | 8.0 | 8.0 | 10.0 |
| Properties of | FV | 26.2 | 25.9 | 29.8 | 26.1 | 26.2 | 28.3 | 35.1 | 21.0 |
| stabilizing liquid | 10 Gel | 1.0 | 1.0 | 1.0 | 1.0 | 1.0 | 7.0 | 11.0 | 1.0 |
| after ground excavation | The filtrate | 9.0 | 8.0 | 15.0 | 19.5 | 19.5 | 31.5 | 33.0 | 45.0 |

We claim:

1. A composition suitable for addition to a excavation stabilizing liquid, comprising:
   (a) a monovalent salt of an unsaturated carboxylic acid (co)polymer having a polymerization degree of 5,000 or less and (b) a compound selected from the group consisting of (i) a monovalent aluminate, (ii) a group II or III metal oxide and (iii) a higher order compound salt.

2. The composition of claim 1, wherein the unsaturated carboxylic acid is acrylic acid, methacrylic acid or combinations thereof.

3. The composition of claim 1, wherein said compound (b) is monovalent aluminate.

4. The composition of claim 1, wherein the monovalent salt of said unsaturated carboxylic acid is an alkali metal salt, an ammonium salt or an amine salt of the unsaturated carboxylic acid.

5. The composition of claim 1, wherein the net weight of copolymer salt (a) is 15 to 85% of the total net weight of component (a) and (b).

6. An excavation stabilizing liquid composition, comprising:
   (a) a monovalent salt of an unsaturated carboxylic acid (co)polymer having a polymerization degree of 5,000 or less, a compound (b) selected from the group consisting of (i) a monovalent aluminate, (ii) a group II or group III metal oxide, and (iii) a higher order compound salt and (c) an inorganic clay.

7. The composition of claim 6, wherein the combined net weight of components (a) and (b) constitutes 0.01 to 5% of the excavation stabilizing liquid.

8. The composition of claim 6, wherein the net weight of component (a) is 15 to 85% of the total net weight of components (a) and (b).

9. The composition of claim 6, wherein the net weight of component (c) is 0.1 to 25% of the excavation stabilizing liquid.

10. The composition of claim 6, wherein the inorganic clay component (c) is a member selected from the group consisting of bentonite, atapalgite, sepiolite, selicite, ilite and cholite.

11. The composition of claim 6, which further comprises a compound (d) which is a member selected from the group consisting of water soluble cellulose derivatives, water soluble starch derivatives and polysaccharides and their derivatives.

12. The composition of claim 11, wherein the net weight of component (d) is 0-3% of the excavation stabilizing liquid.

13. A method for excavating the ground with a stabilizing liquid which circulates or stays within the area being excavated, comprising:
   (a) a monovalent salt of an unsaturated carboxylic acid (co)polymer having a polymerization degree of 5,000 or less, (b) a compound selected from the group consisting of (i) a monovalent aluminate, (ii) a group II or group III metal oxide, and (iii) a higher order of compound salt and (c) an inorganic clay.

14. The method of claim 13, wherein the excavating liquid composition further comprises a compound (d) which is the member selected from the group consisting of water soluble cellulose derivatives, water soluble starch derivatives, and polysaccharides and derivatives thereof.

* * * * *